July 7, 1970     K. HEITMANN ETAL     3,519,334

DEVICE FOR GUIDING THE OBJECTIVE IN AN OPTICAL APPARATUS

Filed Sept. 26, 1967     2 Sheets-Sheet 1

INVENTORS
KNUT HEITMANN
FROMUND HOCK
BY Krafft & Wells
ATTORNEYS

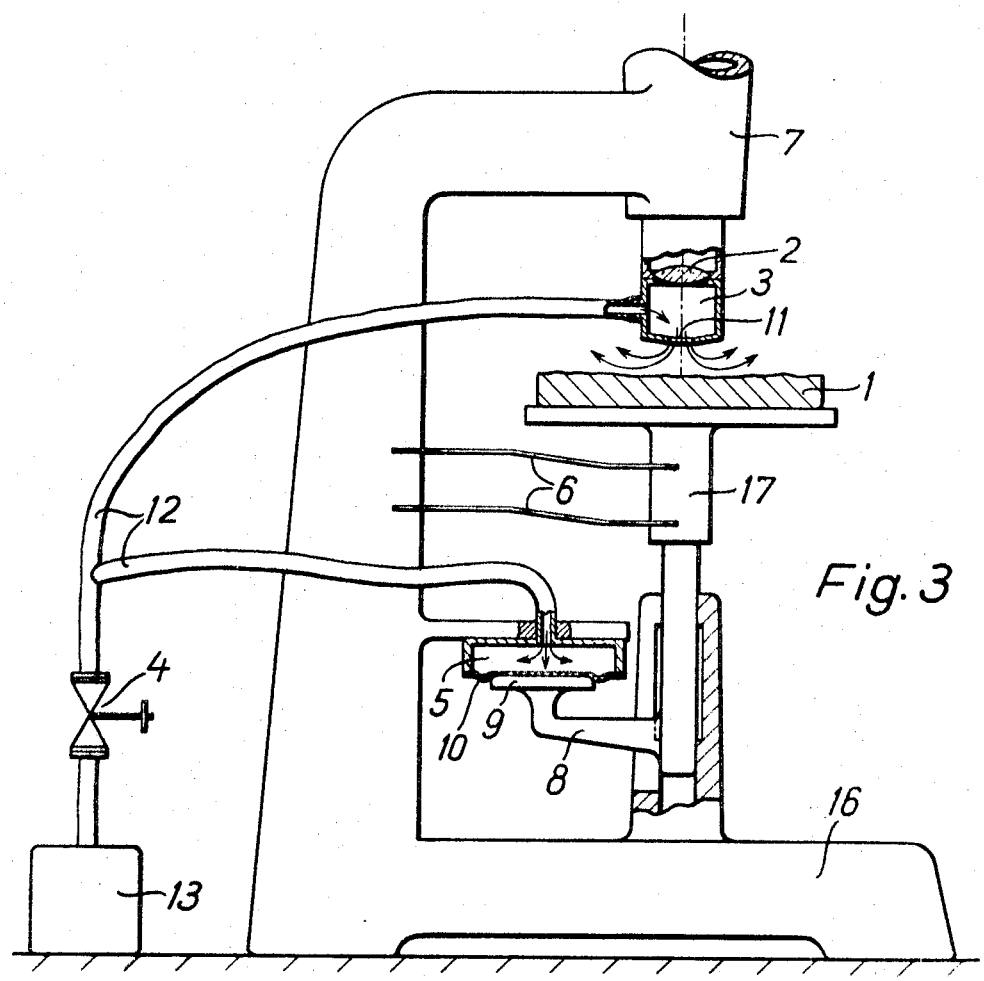

United States Patent Office 3,519,334
Patented July 7, 1970

---

3,519,334
DEVICE FOR GUIDING THE OBJECTIVE IN AN OPTICAL APPARATUS
Knut Heitmann and Fromund Hock, Wetzlar, Germany, assignors to Ernst Leitz, GmbH, Wetzlar, Germany
Filed Sept. 26, 1967, Ser. No. 670,588
Claims priority, application Germany, Sept. 29, 1966,
L 54,666
Int. Cl. G02b 7/02
U.S. Cl. 350—255                                          2 Claims

ABSTRACT OF THE DISCLOSURE

In an optical apparatus comprising an objective by means of which an image of the object or object surface is produced a pneumatic control system is provided for maintaining a constant distance between said objective and the object surface, i.e. for keeping the object surface in focus, even if objective and object are displaced relative to each other in a lateral direction. The control system consists of a first pressure chamber rigidly connected to the objective and having a nozzle directed to the object surface; a second pressure chamber having a membrane on which rests the objective. A hose is employed for interconnecting said two chambers and also for connecting them to a throttle and to the air supply.

---

Reference is made to U.S. Pat. 2,256,245 issued on Sept. 16, 1941 to Hans Fricke of Wetzlar, Germany and assigned to the same assignee as the present application.

BACKGROUND OF THE INVENTION

Field of the invention

The present invention relates to an optical apparatus having an objective and being adapted to produce an image of the object to be observed or to be scanned in an image plane. More specifically the present invention pertains to a device adapted to maintain a constant distance between the objective and the object surface in said apparatus.

Description of the prior art

It is well known that in devices of the above described type the objective must be adjusted to a certain distance from the object in order to produce a sharp image of the object surface in the image plane. Variations from this distance are to be tolerated only within the limits of a given depth of field. This depth of field ($\Delta Z$) depends on the numerical aperture (A) of the objective which aperture must be high for high resolution work and on the wave length of light ($\lambda$):

$$\Delta z = \pm \frac{0.5\lambda}{A^2}$$

With a high resolution objective having an aperture of $A = 0.5$ and using light of the wave length $\lambda = 0.5$ $\mu$m the tolerable depth of field amounts only to $\pm 1$ $\mu$m.

Maintaining the distance of the objective from the object within said narrow limits presents no difficulties if the object is visually observed through an ocular, as is done, for example, in microscopes. All microscopes are provided with means adapted for manually focusing the objective. However, problems of this nature are encountered if, for example, high-resolution microscope-objectives are to be used in devices adapted for photoelectrically scanning the object since with those apparatuses no visual control is possible. A guiding device must then be provided which automatically maintains the given distance between object and objective.

The problem becomes somewhat less difficult if the object plane coincides with the surface of a plane object such as the lines on the surface of a measuring bar. As a means adapted to solve this problem, devices for mechanically and optically scanning the object have already been suggested. An example of the first mentioned mechanical scanning means is disclosed in U.S. Pat. No. 2,256,245. However, it is a disadvantage inherent in said means that the surface of the object may easily be deformed or even damaged. Also, it is not possible with such a device to perform the scanning immediately adjacent the measuring mark. In this respect those devices are more advantageous which use an optical scanning method. Unfortunately, these devices are extremely complex.

SUMMARY OF THE INVENTION

It is therefore an object of the present invention to provide a novel device of simple design for maintaining the distance between the objective and the object.

It is another object of the invention to provide a device wherein either the objective is made displaceable along the optical axis and the object carrier is kept stationary or vice versa.

A further object of the invention is to provide a control device by means of which the surface of objects of different thicknesses may be observed or scanned successively with the same objective without the necessity of any manual refocussing.

A still further object of the invention is to provide a control device which automatically prevents dust from settling on the object surface.

These objects are achieved by employing a pneumatic control system adapted to automatically control the position of the objective relative to the object.

In a first embodiment said control system comprises a first pressure chamber rigidly connected to the objective and having at least one nozzle directed towards the object. Guide means are provided adapted to allow for displacement of said objective along the optical axis thereof. A second pressure chamber is provided having a membrane on which the objective rests. Hoses or small pipes connect said two chambers and also connect said chambers to a throttle and to the air supply. The first and second pressure chamber constitute a closed pneumatic control loop which is supplied with air by means of the throttle and the air supply system, e.g. a pump.

DESCRIPTION OF THE DRAWINGS

The invention will be more readily comprehended from the following explanation when taken in conjunction with the appending drawings wherein

FIG. 3 is a schematic illustration of a second embodiment of the invention.

Figure 1:
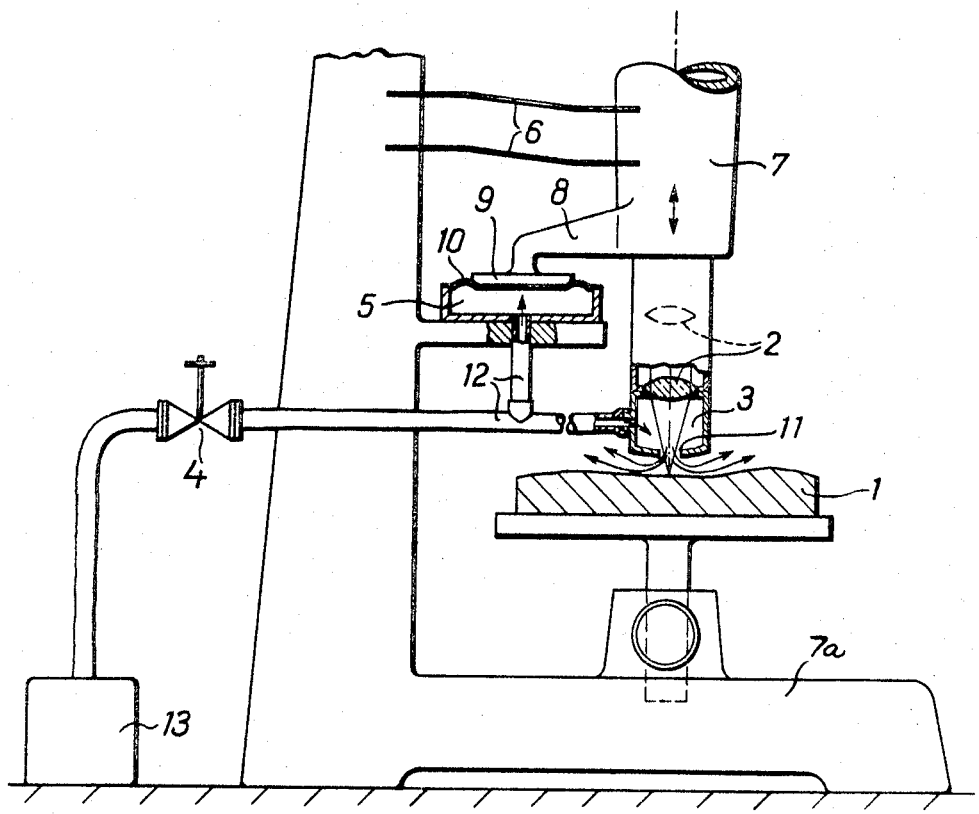
FIG. 1 is a schematic illustration of a first embodiment of the invention.

The nature of the optical apparatus illustrated in FIGS. 1 and 3 is not specifically defined. It may be any type of apparatus utilizing an objective, e.g. a measuring instrument or even a microscope. In any case the apparatus is provided with an objective 2 mounted on a tube 7. By means of two leaf springs 6 the tube 7 is hinged on the stand 7a in a way as to allow for a vertical displacement of objective 2 along the optical axis. An arm 8 is rigidly connected to tube 7 and at its free end is provided with a plate 9. The latter rests on a membrane 10 of a pressure chamber 5 which is supported by stand 7a.

The objective 2 is also provided with a pressure chamber 3 which has a nozzle 11 directed towards the object 1. Both pressure chambers 3 and 5 are connected by a hose 12 and by the same hose are also connected to a throttle 4 which, in turn, is in connection with the air supply system 13.

The above described device functions as follows: Both pressure chambers 3 and 5 in combination with the throttle 4 constitute a pneumatic amplifier. If the output pressure of this amplifier varies, the nozzle 11 together with objective 2 is displaced along the optical axis until again balanced pressure conditions prevail. It will thus be understood that the elements form a control system which constantly maintains the distance between object 1 and objective 2 according to the regulation of throttle 4 even if the position of object 1 varies in the direction of the optical axis.

The accuracy of the control and its frequency response may be adjusted to various conditions within broad limits by means of additional pneumatic amplifiers and feedback loops known per se.

Figure 2:
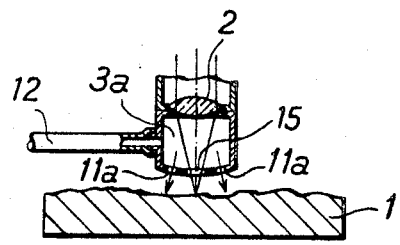
FIG. 2 shows schematically a specific design of the first pressure chamber having more than one nozzle.

The basic embodiment of the invention as illustrated by FIG. 1 is susceptible to modifications as, for example, shown in FIGS. 2 and 3. Instead of being provided with one nozzle only the pressure chamber 3a (FIG. 2) has a plurality of nozzles 11a arranged on the circumference of a circle concentric to the optical axis. Separate from said nozzles a window 15 for the observation beam is provided, which window is closed by a glass plate.

Maintaining a constant distance between object and objective may also be achieved by controlling the position of the displaceable object carrier. An embodiment of this type is depicted in FIG. 3. The tube 7 is rigidly connected to the stand 16 and object carrier 17 is hinged on the leaf springs 6 and thus made movable along the optical axis. Pressure chamber 5 is still mounted on stand 16; however, in this embodiment it is the object carrier which by means of arm 8 rests on membrane 10. The hose 12 is connected to the pressure chambers and to the throttle as before.

In a further embodiment (not shown) it is of course possible to have the objective as well as the object carrier movable along the optical axis, i.e. to combine the embodiments illustrated in FIGS. 1 and 3.

What is claimed is:

1. An optical apparatus having an optical axis comprising:
   an objective for projecting an image of an object into an image plane;
   an objective carrier;
   an object carrier;
   guide means mounting one of said carriers to guide said one carrier for movement in parallel direction to the optical axis relative to the other of said carriers;
   means biasing said carriers toward each other along the optical axis;
   an air pressure chamber being rigidly connected to said objective and having an air discharge nozzle directed towards the object, said nozzle being arranged concentrically to the optical axis and defining an aperture both for an image transferring light beam to the objective and for air flow discharged from the nozzle;
   an expansible air chamber drivingly connected to move said one carrier along the optical axis relative to said other carrier;
   a pressurized air source supplying pressurized air to said pressure chamber;
   feedback means transferring fluid pressure from said pressure chamber to said expansible air chamber;
   said nozzle and said expansible air chamber being constructed so that the resultant force produced by said expansible chamber is substantially larger than the resultant force produced by said nozzle along the optical axis to constitute said expansible air chamber and feedback means a force amplifier; and
   throttle means between said chambers and said pressurized air source.

2. The apparatus according to claim 1, including a plurality of additional nozzles arranged concentrically around said first-mentioned nozzle for discharging air from said air pressure chamber.

References Cited

UNITED STATES PATENTS

| 3,194,055 | 7/1965 | Knobel | 73—375 |
| 2,256,245 | 9/1941 | Fricke | 350—84 |
| 3,081,682 | 3/1963 | Khoury. | |

DAVID SCHONBERG, Primary Examiner

R. L. SHERMAN, Assistant Examiner

U.S. Cl. X.R.

73—37.5